Figure 1:
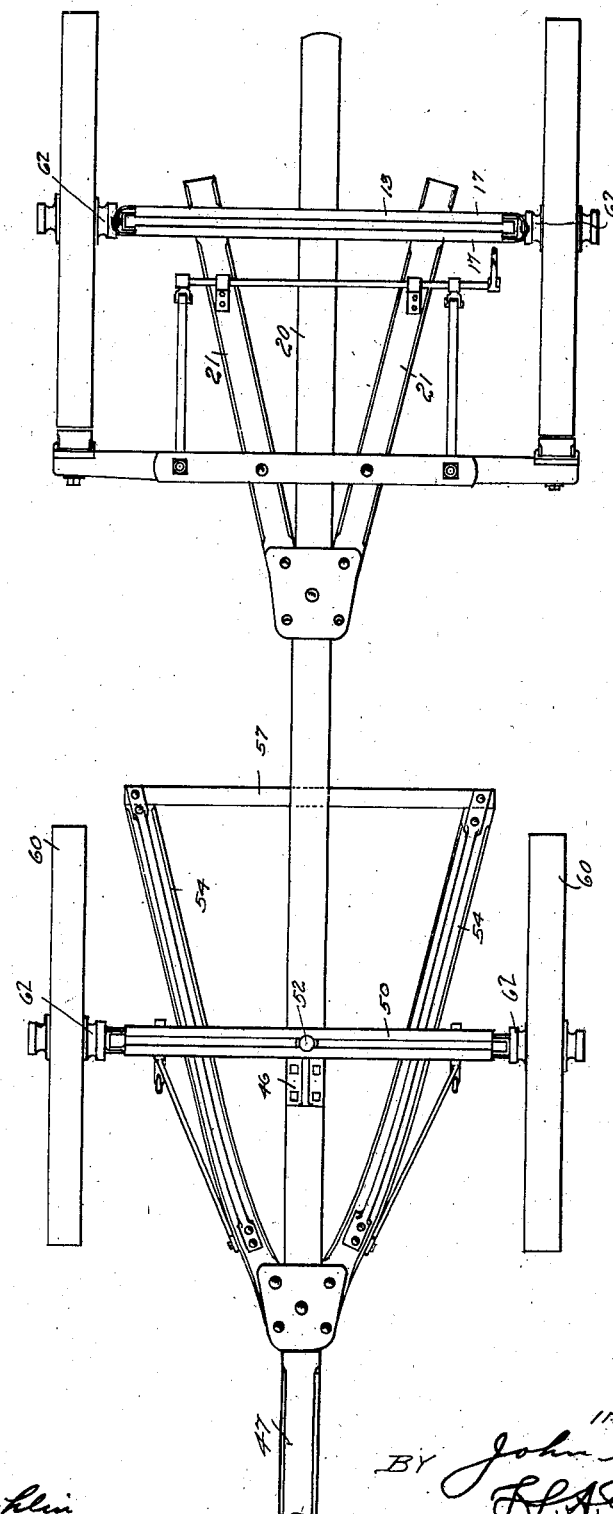

No. 728,252. PATENTED MAY 19, 1903.
J. S. LAYTON.
RUNNING GEAR FOR VEHICLES.
APPLICATION FILED OCT. 4, 1902.
NO MODEL. 3 SHEETS—SHEET 1.

WITNESSES: INVENTOR
BY
ATTORNEY.

No. 728,252. PATENTED MAY 19, 1903.
J. S. LAYTON.
RUNNING GEAR FOR VEHICLES.
APPLICATION FILED OCT. 4, 1902.
NO MODEL. 3 SHEETS—SHEET 2.
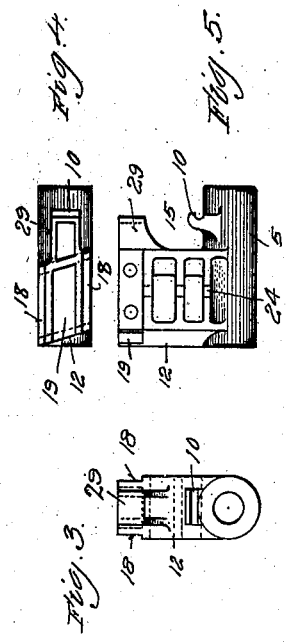
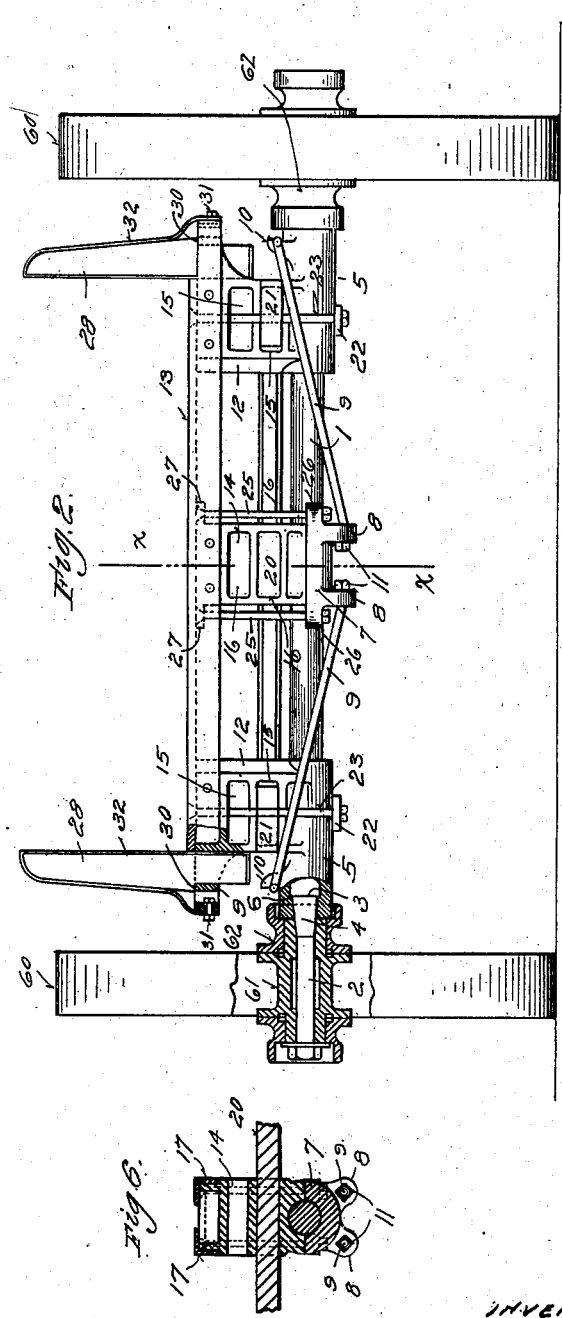

No. 728,252. PATENTED MAY 19, 1903.
J. S. LAYTON.
RUNNING GEAR FOR VEHICLES.
APPLICATION FILED OCT. 4, 1902.
NO MODEL. 3 SHEETS—SHEET 3.
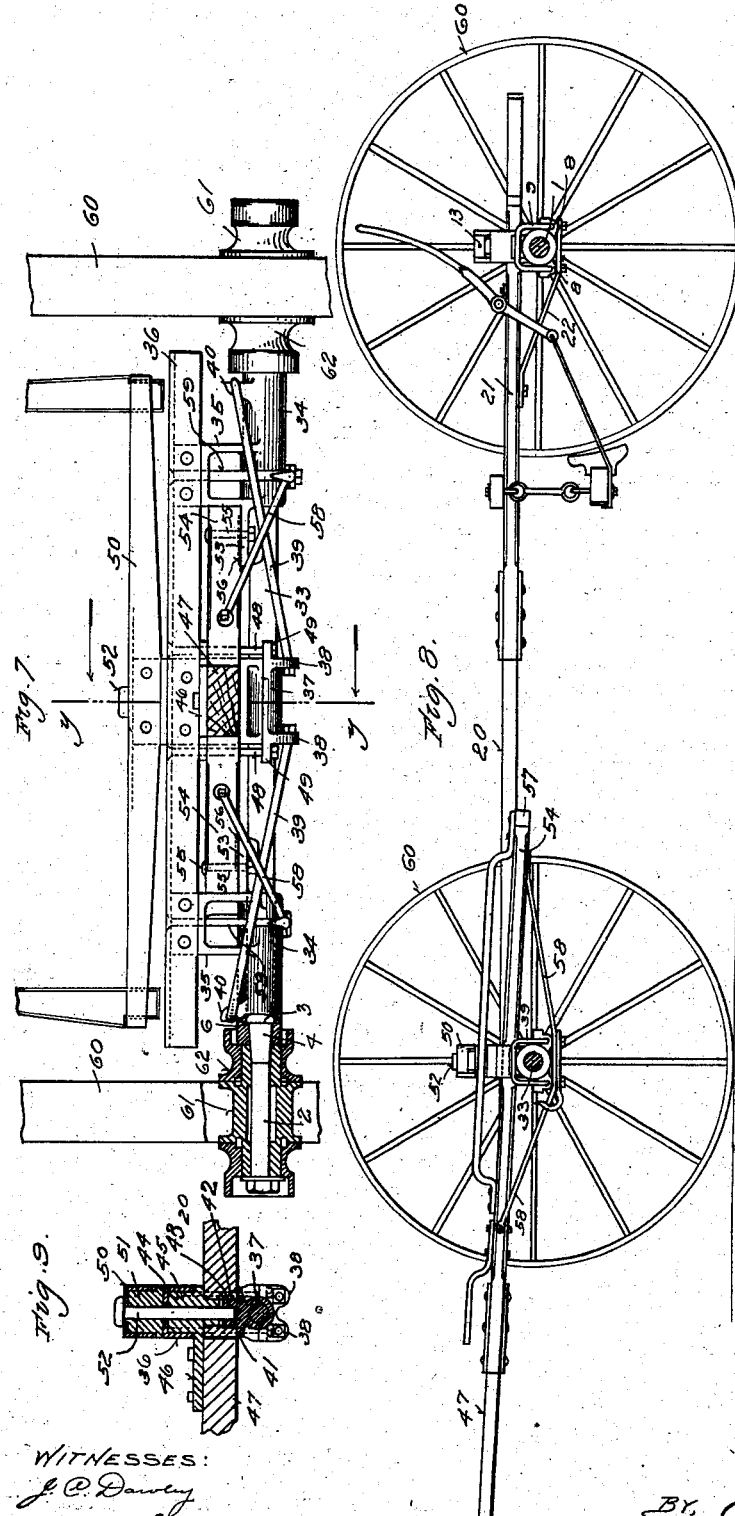
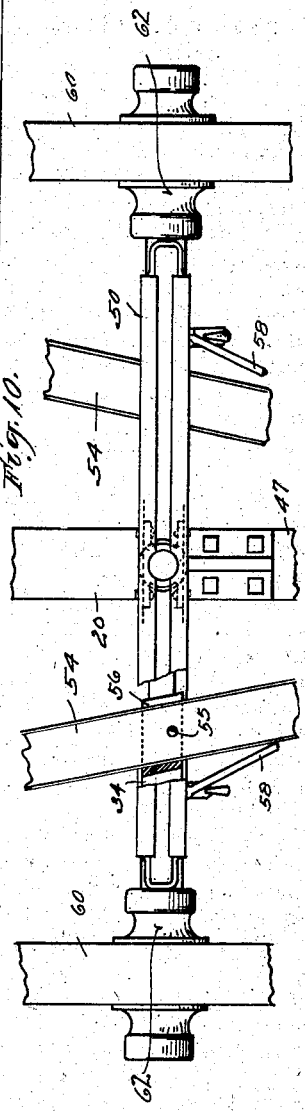
WITNESSES:
INVENTOR
ATTORNEY.

No. 728,252. Patented May 19, 1903.

UNITED STATES PATENT OFFICE.

JOHN S. LAYTON, OF SPRINGFIELD, OHIO.

RUNNING-GEAR FOR VEHICLES.

SPECIFICATION forming part of Letters Patent No. 728,252, dated May 19, 1903.

Application filed October 4, 1902. Serial No. 125,889. (No model.)

*To all whom it may concern:*

Be it known that I, JOHN S. LAYTON, a citizen of the United States, residing at Springfield, in the county of Clark and State of Ohio, have invented certain new and useful Improvements in Running-Gear for Vehicles, of which the following is a specification, reference being had therein to the accompanying drawings.

This invention relates to running-gear for vehicles, and has for its object to provide a simple, strong, and durable structure of this character having certain advantages which will be hereinafter more particularly pointed out.

To these ends my invention consists in certain novel features, which I will now proceed to describe and will then particularly point out in the claims.

In the accompanying drawings, Figure 1 is a plan view of a construction embodying my invention in one form. Fig. 2 is a rear elevation, partly in vertical section, of the rear portion of the vehicle. Figs. 3, 4, and 5 are respectively end and top plan views and rear elevation of one of the sleeves and brackets of the rear bolster. Fig. 6 is a detail sectional view taken on the line *x x* of Fig. 2. Fig. 7 is a front elevation, partly in section, of the front part of the vehicle. Fig. 8 is a side elevation of the vehicle. Fig. 9 is a detail sectional view taken on the line *y y* of Fig. 7 and looking in the direction of the arrows, and Fig. 10 is a plan view of what is shown in Fig. 7.

Referring to the said drawings, 1 indicates the rear axle, which is a continuous axle extending across the vehicle and preferably metallic and circular in cross-section. This axle terminates at each end in a spindle 2 of less diameter than the body of the axle, thus forming a shoulder 3 near each end of the axle at the junction of the spindle therewith. Preferably each spindle is provided with a tapering or conical portion 4, extending from the shoulder 3 to the body of the spindle. On each end of the body of the axle there is mounted a sleeve 5, which is adapted to slip over the spindle and which is provided at its outer end with a shoulder 6, which engages with the shoulder 3 of the axle, so as to limit the inward movement of the sleeve along the axle under the strain of the truss-rods hereinafter referred to. Upon the central part of the axle is secured a sleeve 7, preferably divided longitudinally in the manner hereinafter described, so as to facilitate its application to and removal from the axle, and this sleeve 7 has downwardly-projecting portions or lugs 8, from which truss-rods 9 extend upward and outward to the sleeves 5, to which they are connected. Preferably each truss-rod is double and made in the form of a single continuous piece bent into U shape, the bend passing around a hook-shaped projection 10 on the upper side of the corresponding sleeve 5, near the outer end thereof, while the other ends are threaded and pass through the corresponding lug or projection 8 of the central sleeve, on the inner side of which their threaded extremities are provided with nuts 11, by means of which the truss-rods may be properly tensioned. Each of the sleeves 5 has on its upper side an upwardly-extending bracket 12 to support the rear bolster 13, and the central sleeve 7 has a similar bracket 14, which supports the rear bolster at its middle portion, the brackets 12 supporting the ends thereof. Each bracket 12 is preferably cast in one piece with the corresponding sleeve and cored out to form longitudinal holes or apertures 15, thereby lightening and cheapening the structure by dispensing with metal. The central bracket 14 is similarly cored out to form longitudinal apertures 16 for the same purpose. The bolster 13 may be of any suitable construction; but I prefer to employ a bolster which I have devised and which consists of two angle-bars 17, each angle-bar having one of its flanges horizontal and the other vertical. The sides of the brackets 12 and 14 are recessed at the top, as indicated at 18, to receive the vertical flanges of the angle-bars 17, which are riveted or otherwise secured thereto, and the horizontal flanges of the angle-bars extend toward each other over the tops of the brackets, which are preferably cut away, as indicated at 19, to save metal and give lightness. It will thus be observed that each bracket consists of a body portion comprising two vertical members extending in a general direction longitudinally of the vehicle and parallel with each other, horizontal members connecting these vertical members and two transverse parallel members at the top, thus giving a strong and light construction. It will be observed that the lowermost aperture 16 of the central bracket 14 serves to receive the rear end of the reach 20, which passes therethrough, while the lowermost apertures 15 of the side brackets 12 serve to receive the rear ends of the hounds 21. For this purpose the last-mentioned apertures, together with the brackets wherein they are formed, are somewhat inclined to the longitudinal plane of the vehicle, as shown. Braces 22 connect the hounds 21 to the under sides of the corresponding brackets 5, and these braces are secured in position by bolts 23, which pass down through the bolster 13 and alongside of the brackets 15, which are notched, as indicated at 24, to receive and prevent lateral displacement of said bolts, the bolts extending downward through the ends of the braces 22 below the sleeves 5.

As hereinbefore stated, the central sleeve 7 is preferably divided horizontally or made in two parts to facilitate its application to the axle, and these parts are united by bolts 25, which pass through lugs 26 at each end of the lower half of the sleeve 7 and through similar lugs 27 at each end of the top of the bracket 14.

In order to afford a suitable connection for the standards 28, each bracket 12 is provided at its outer end with a loop 29, through which the reduced lower end of the standard passes, the shoulder 30 of the standard resting on the loop, as shown in detail at the left hand of Fig. 2. When the bolster proper is constructed of angle-irons, these angle-irons have their horizontal flanges cut away at the ends of the bolster, while their vertical flanges are extended out beyond the brackets 12 and beyond the loops 29 and there overlapped and secured by bolts or rivets 31. The standards 28 are, as usual, provided with a sheathing-strip 32 of metal to protect the wooden body of the standard, and the outer end of this strip is deflected outward, so as to meet and overlap the meeting ends of the angle-bars 17, and is secured thereto by the same bolt 31.

The construction at the front axle is similar to that already described with respect to the rear axle, with the modifications due to the fact that the sand-board here takes the place of the bolster and that the reach is pivotally connected to the front-axle structure. The front axle is indicated at 33, and the sleeves, which fit over its ends, at 34. Each sleeve 34 has a bracket 35 arising from its inner end, and the sand-board 36 is supported at its ends by these brackets 35, to which it is secured. The sand-board is constructed of angle-bars in the same manner as the rear bolster. Upon the front axle is mounted a central sleeve 37, preferably horizontally divided, as shown in Fig. 9, to facilitate its application to the axle and provided with lugs 38 on its under side to receive the inner ends of the truss-rods 39, which pass around projections 40 on the upper sides of the sleeve 34. The upper member of the central bracket 37 has a flat bearing-surface 41 on its upper side to receive the forward end of the reach 20, said reach resting thereon and having a vertical circular aperture 42, into which extends a central circular boss 43, arising from the bearing-surface 41 of the sleeve 37. A bracket-casting 44, secured to the central part of the sand-board 36, rests upon the top of the forward end of the reach 20 and has a central boss 45 extending down into the aperture 42. This bracket-casting 44 also has a forwardly-extending flange 46, to the under side of which the tongue 47 is bolted. Bolts 48 pass down through the bracket-casting 44 on each side thereof and on each side of the reach and through lugs 49 at each end of the lower half of the central sleeve 37, and these bolts serve to unite the bracket member 44 to the central sleeve 37 and at the same time hold the upper and lower parts of said sleeve together. The front bolster is indicated at 50, and it is also preferably constructed in the manner already described of angle-bars united to a central casting 51, the king-bolt 52 passing down through the casting 51 and through the bracket member 44 and its extension 45 into the boss 43, thus securing the front bolster and reach to the front-axle structure.

Each sleeve 34 and bracket 35 is provided with an inward extension 53, and the front hounds 54 rest upon these extensions and are secured thereto by bolts 55. The inner walls of the brackets 35 are inclined to conform to the inclination of the hounds, and the inner edges of the extensions 53 are preferably correspondingly inclined and provided with an upwardly-extending flange 56, between which and the adjacent face of the corresponding bracket the hounds are firmly held. The rear ends of the hounds are connected in the usual manner by a cross-piece 57, passing under the reach, and braces 58 extend from the rear ends of the hounds, under the sleeves 34, to the forward portions of the hounds. Bolts 59 pass downward through the sand-board 36 and through the brackets 35 on each side thereof and extend down through the braces 58 at the points where they pass under the sleeves 34, securing them in position at those points.

The wheels (indicated as a whole at 60) may be of any suitable construction, but are preferably constructed of metal, and their hubs 61 constitute boxes to receive the axle-spindles and are tapered at their inner ends to receive the tapering portions 4 of said spindles and are further provided with collars or bands 62, which extend over and cover and protect the outer ends of the sleeves 5 and 34.

It will be observed that by the construction which I have devised the axles are strengthened by means of the truss-rods, which rods not only have this strengthening function, but also serve to secure in place the sleeves whereby the brackets which support the rear bolster and sand-board are held in position on the axles. It will also be noted that the axle forms the compression member of the truss, while the truss-rods form the tension member thereof.

The construction set forth, considered as a whole, is simple and strong without being unduly heavy, and the several parts may be readily assembled and as readily taken apart, if necessary or desirable.

I do not wish to be understood as limiting myself to the precise details of construction hereinbefore described, and shown in the accompanying drawings, as the same may obviously be modified without departing from the principle of my invention.

Having thus fully described my invention, what I claim as new, and desire to secure by Letters Patent, is—

1. The combination, with a continuous non-rotating axle and a bolster or sand-board above the same, of sleeves mounted on the axle near the ends and center thereof and adapted to support the corresponding parts of the bolster or sand-board, and truss-rods extending downwardly and inwardly from the end sleeves to the central sleeve, the axle constituting a compression member of the truss, substantially as described.

2. The combination, with a continuous axle and a bolster or sand-board above the same, of sleeves adapted to slip over the ends of the axle and support the outer portions of the bolster or sand-board, means for limiting the inward motion of said sleeves, a central sleeve mounted on the axle and adapted to support the central part of the bolster or sand-board, and truss-rods connected with the end sleeves and extending downwardly and inwardly and connected to the central sleeve, substantially as described.

3. The combination, with a continuous axle and a bolster or sand-board above the same, said axle being provided with shoulders inward from its ends, of sleeves adapted to slip over the ends of the axle and engage the shoulders thereof, said sleeves serving to support the outer portions of the bolster or sand-board, a central divided sleeve adapted to be secured to the axle and support the central part of the bolster or sand-board, and truss-rods connected to the end sleeves and extending thence inward and downward and connected to the central sleeve, substantially as described.

4. The combination, with a continuous axle and a bolster or sand-board above the same, of sleeves adapted to slip over the ends of the axle and support the outer portions of the bolster or sand-board, means for limiting the inward motion of said sleeves, each of said sleeves being provided on its upper side with a projection, a central sleeve mounted on the axle and supporting the central part of the bolster or sand-board, said central sleeve being provided with downward projections, and U-shaped truss-rods passing around the projections of the end sleeves and having their threaded ends extended through the projections of the central sleeve and provided with nuts, substantially as described.

5. The combination, with a continuous axle and a bolster or sand-board above the same, of sleeves mounted on the axle near the ends and center thereof and provided with upwardly-extending integral brackets to support the corresponding parts of the bolster or sand-board, and truss-rods extending downwardly and inwardly from the end sleeves to the central sleeve, substantially as described.

6. The combination, with a continuous axle and a bolster or sand-board above the same, the axle comprising a central body portion and end spindles and having shoulders formed at the junctions of the spindles and body portions, of end sleeves adapted to slip over the spindles and engage the shoulders, a sleeve mounted centrally on the axle, said sleeves supporting the bolster or sand-board, truss-rods connected with the end sleeves and extending downwardly and inwardly and connected to the central sleeve, and wheels fitting on the spindles and having their hubs abutting against the outer extremities of the end sleeves, substantially as described.

7. The combination, with a continuous axle and a sand-board or bolster above the same, of sleeves mounted on the axle near the ends and center thereof, truss-rods connecting the end sleeves and central sleeve, and integral brackets extending upward from said sleeves to support the bolster or sand-board, the central bracket being adapted to receive and support the reach, and the end brackets being adapted to receive and support the hounds, substantially as described.

8. As a means for connecting an axle and bolster or sand-board, a structure comprising a sleeve to fit the axle, and an integral bracket arising therefrom and comprising vertical side members and horizontal connecting members, the spaces between said members forming apertures to receive the parts of the running-gear frame, substantially as described.

9. The combination, with a front axle having a central divided sleeve, the upper member provided with a bearing-surface and a central boss, of a sand-board provided with a central bracket-casting having a similar central boss, a tongue connected with said bracket-casting, a reach having its front end resting on the bearing-surface and apertured to receive the bosses, a front bolster, and a king-bolt passing downward through the front bolster and the bracket-casting and its boss, and extending into the lower boss, substantially as described.

In testimony whereof I affix my signature in presence of two witnesses.

JOHN S. LAYTON.

Witnesses:
E. O. HAGAN,
IRVINE MILLER.